Nov. 26, 1963     KOKUJI TAKEHARA     3,111,875
FIBER CUTTING DEVICE

Filed April 4, 1961

INVENTOR
Kokuji Takehara

By
ATTORNEYS

United States Patent Office 3,111,875
Patented Nov. 26, 1963

3,111,875
FIBER CUTTING DEVICE
Kokuji Takehara, No. 20/22, Muko-Machi Oaza, Kaede Koaza Inaba, Otokuni-gun, Prefecture of Kyoto, Japan
Filed Apr. 4, 1961, Ser. No. 100,573
Claims priority, application Japan Feb. 7, 1956
1 Claim. (Cl. 83—174)

This invention relates to an improvement in a fiber cutting device by means of which a fiber bundle is pinched between a rotary cutting roller with a hard porcelain layer on its surface and guide rollers which are in contact with the upset surface of the cutting roller, the fiber bundle which is supported on one side of the cutting roller being cut to the desired length by means of rotatory blades, the edges of which are in line contact with the circumferential surface of the rotatory cutting roller and which rotate in the opposite direction to the cutting roller. The circumferential speed of the said edges can be made higher than the circumferential surface speed of the cutting roller. The edge of the rotary cutting blades can be sharpened by manipulating the rotor carrying the blades and touching the blades to the hard porcelain layer on the surface of the rotatory cutting roller. This invention has the following object and presents the following advantages.

By means of a simple mechanism, abrasion of the rotatory blade is reduced to a minimum and the edges can easily be sharpened; hence it is not necessary to change the blades until they are completely worn out. The cutting of the fiber bundle can be performed without trouble and the fiber bundle, whether it is wet or dry, can be cut to the desired length, accurately and at high speed.

The drawings show an embodiment of the present invention.

Figure 1:
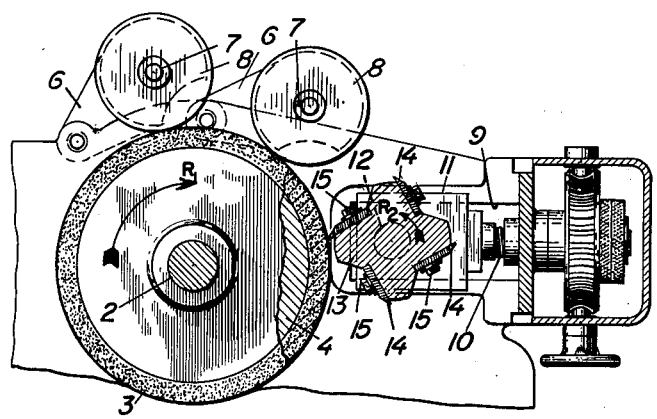
FIG. 1 is an elevation view, partly in section, of the fiber cutting device according to the invention in normal operating position.
Figure 2:
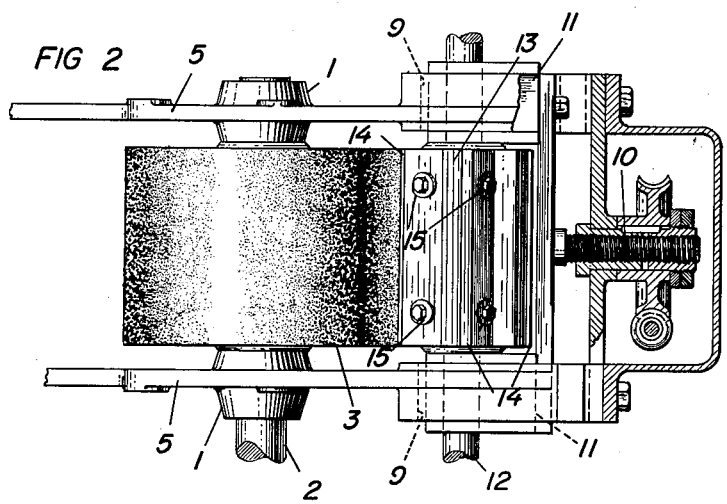
FIG. 2 is a plan view of the device of FIG. 1 partially in cross section.

A rotatory cutting roller 4 covered with a hard porcelain layer 3 is mounted on a horizontal spindle 2, supported by bearings 1 mounted on spaced parallel side frames 5. The upper side of the said roller is touched by guide rollers 8, which in turn are mounted on spindles 7 which are fitted on supports 6 pivoted to the spaced parallel side frames 5. In substantially horizontal grooves 9 on the side frames 5 is fitted a spindle 12 which is mounted on hubs 11, the latter being slidable back and forth in grooves 9 by means of a screw 10. The axis of spindle 12 is a distance $h$ above the level of the axis of spindle 2 on which the porcelain covered roller is mounted. On a rotor 13 mounted on the spindle 12 are mounted blades 14. These blades are held in place by means of screws 15, so that the edges make line contact with hard porcelain layer 3 on the circumferential surface of the rotatory cutting roller 4, when the blades 14 turn with the rotor 13. Moreover, the edges of blades 14 are beveled at 14' with the bevel facing outwardly of the spindle 12. The bevel 14' on each blade 14 is on the side of the blade which faces away from the direction of rotation $R_2$ of the spindle 12 and hub 13. Furthermore, the direction of rotation $R_2$ of rotor 13 is opposite to the direction of rotation $R_1$ of the cutting roller, so that the circumferential speed of the blades may be higher than the circumferential surface speed of the hard porcelain layer 3 on the rotatory cutting roller 4.

As mentioned, above, this fiber cutting device is constructed in such a way that the edges of blades 14 can be placed in line contact with the circumferential surface of the hard porcelain layer 3 of the rotatory cutting roller 4. Since these blades turn in the opposite direction to the said roller, the circumferential speed of the said edges can be made to be higher than the circumferential speed of the hard porcelain layer 3 of the rotatory cutting roller 4, so that the fiber bundle guided and supported on one side of the hard porcelain layer 3 of the rotatory cutting roller 4 is cut by means of the said rotating blades 14. Since the fiber bundle is perfectly guided and supported by the rough surface of the hard porcelain layer on the surface of the rotatory cutting roller 4, no shock is given to the blades, and hence the fiber is cut gently and the abrasion of the blades is reduced to a minimum.

Figure 3:
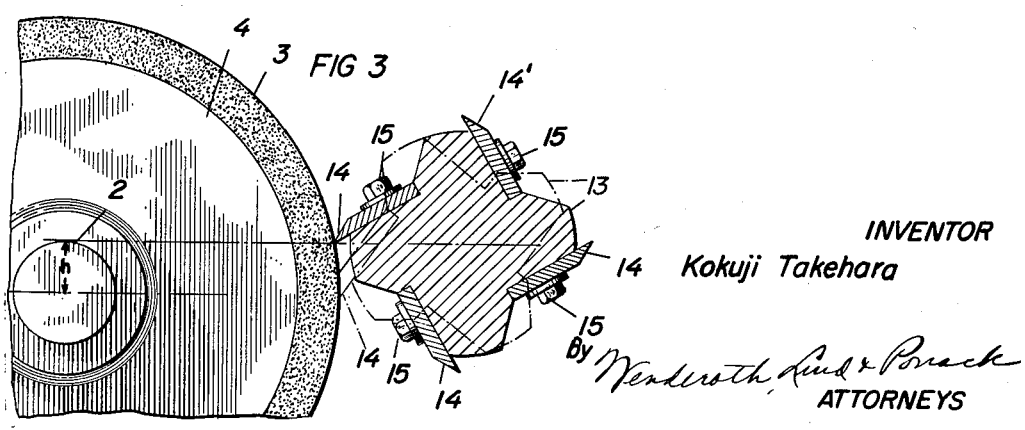
FIG. 3 is an elevation view similar to FIG. 1 showing the device in position for sharpening the blades.

In case the blades wear out or do not cut well, it is only necessary to touch the edges of the blades 14 to the surface of the hard porcelain layer 3 on the surface of the rotatory roller 4 in order to sharpen them. However, the sharpening action is not produced with the blades in the cutting position relative to the face of the stone roller. As illustrated in FIG. 3 the rotor 13 is rotated so that a blade 14 moves past the cutting position until the bevel 14' of the blade is substantially parallel to the surface of the porcelain layer 3 on rotary cutting roller 4. The rotor 13 is then moved toward the rotary cutting roller 4, as illustrated by the dashed lines, until the bevel 14' bears on the surface of the roller 4.

The effect of this action is to cause the relative movement between the porcelain surface of the cutting roller and the beveled surface of the blades during the sharpening action to be from the tip of the blade toward the root, which is the direction for correct sharpening of the blade. This is the conventional and correct manner of sharpening such a beveled blade. The material of the blade is always removed from the bevel, and never from the back of the blade.

This application is a continuation-in-part of application Serial No. 637,826, filed February 1, 1957, and now abandoned.

I claim:

Apparatus for cutting fibers comprising two spaced parallel side frames each having a substantially horizontal groove therein along a part of the length thereof, a horizontal rotary cutting roller rotatably mounted transversely between said parallel side frames and spaced from the ends of said grooves, a hard porcelain layer on the outer periphery of said cutting roller, a pair of guide rollers pivoted to said frame and resting on said rotatory cutting roller, a pair of hubs, one slidably mounted in each groove, a rotor rotatably mounted between said hubs at a level above the level of the axis of rotation of said rotary cutting roller, a plurality of blades removably mounted on said rotor, each blade having a beveled edge with the bevel facing outwardly of said rotor and being on the side of the blade which is facing away from the direction of rotation of said rotor, each blade extending along the length of said rotor and said blades being uniformly spaced around the periphery of said rotor, and means for moving said rotor and hubs along said grooves toward and away from said cutting roller.

References Cited in the file of this patent
UNITED STATES PATENTS

| 1,909,235 | Stuhlmann | May 16, 1933 |
| 2,236,160 | Seaman | Mar. 25, 1941 |
| 2,299,650 | Parks | Oct. 20, 1942 |
| 2,305,312 | Kern | Dec. 15, 1942 |
| 2,719,336 | Stotler | Oct. 4, 1955 |
| 2,829,689 | Jarvis | Apr. 8, 1958 |

FOREIGN PATENTS

| 605,280 | Great Britain | July 20, 1948 |
| 677,761 | Great Britain | Aug. 20, 1952 |
| 750,639 | Great Britain | June 20, 1956 |